US011308158B2

(12) United States Patent
Matsubara et al.

(10) Patent No.: US 11,308,158 B2
(45) Date of Patent: Apr. 19, 2022

(54) INFORMATION PROCESSING SYSTEM, METHOD FOR CONTROLLING INFORMATION PROCESSING SYSTEM, AND STORAGE MEDIUM

(71) Applicant: Hitachi, Ltd., Tokyo (JP)

(72) Inventors: Daisuke Matsubara, Tokyo (JP); Nobuo Nukaga, Tokyo (JP)

(73) Assignee: HITACHI, LTD., Tokyo (JP)

( * ) Notice: Subject to any disclaimer, the term of this patent is extended or adjusted under 35 U.S.C. 154(b) by 331 days.

(21) Appl. No.: 16/404,941

(22) Filed: May 7, 2019

(65) Prior Publication Data

US 2020/0097501 A1 Mar. 26, 2020

(30) Foreign Application Priority Data

Sep. 20, 2018 (JP) .............................. JP2018-176204

(51) Int. Cl.
*G06F 16/75* (2019.01)
*G06T 7/246* (2017.01)
(Continued)

(52) U.S. Cl.
CPC ............ *G06F 16/75* (2019.01); *G06F 16/738* (2019.01); *G06F 16/7335* (2019.01);
(Continued)

(58) Field of Classification Search
CPC .... G06F 16/75; G06F 16/7335; G06F 16/738; G06F 16/7837; G06F 16/55; G06F 16/532; G06F 16/54; G06T 7/248; G06T 7/70
(Continued)

(56) References Cited

U.S. PATENT DOCUMENTS

2010/0318523 A1 12/2010 Lee et al.
2011/0052069 A1\* 3/2011 Nakabayashi ....... G11B 27/105
382/190
(Continued)

FOREIGN PATENT DOCUMENTS

| CN | 105760461 A | 7/2016 |
| JP | 2009-042879 A | 2/2009 |
| JP | 2013-101431 A | 5/2013 |

OTHER PUBLICATIONS

Extended European Search Report received in corresponding European Application No. 19182873.0 dated Nov. 26, 2019.
(Continued)

*Primary Examiner* — Hicham Skhoun
(74) *Attorney, Agent, or Firm* — Mattingly & Malur, PC

(57) ABSTRACT

Provided is an information processing system, including a processor, a storage device and a display device. The storage device stores images captured by imaging devices. If an image of a moving object is selected as a search query, then the processor executes a similarity search on the images stored in the storage device, with the selected image as the search query. The display device displays images attained as results of the similarity search. If an image of a moving object is added as a search query, then the processor executes a similarity search with all selected images as search queries. The display device updates images to be displayed such that images attained as results of the similarity search performed with all the selected images as the search queries are displayed.

10 Claims, 10 Drawing Sheets

(51) Int. Cl.
*G06T 7/70* (2017.01)
*G06F 16/732* (2019.01)
*G06F 16/738* (2019.01)
*G06F 16/783* (2019.01)

(52) U.S. Cl.
CPC .......... *G06F 16/7837* (2019.01); *G06T 7/248* (2017.01); *G06T 7/70* (2017.01)

(58) Field of Classification Search
USPC ........................................................ 707/723
See application file for complete search history.

(56) References Cited

U.S. PATENT DOCUMENTS

| | | | |
|---|---|---|---|
| 2011/0096994 A1* | 4/2011 | Hirai | G06F 16/58 382/190 |
| 2011/0106845 A1 | 5/2011 | Lipson et al. | |
| 2011/0320463 A1* | 12/2011 | Yoshio | G06K 9/6263 707/749 |
| 2016/0005171 A1 | 1/2016 | Watanabe et al. | |
| 2016/0012280 A1 | 1/2016 | Ito et al. | |
| 2016/0217158 A1 | 7/2016 | Watanabe et al. | |
| 2016/0343147 A1 | 11/2016 | Nukaga et al. | |
| 2017/0017833 A1* | 1/2017 | Watanabe | G06K 9/00288 |
| 2018/0060356 A1 | 3/2018 | Watanabe et al. | |
| 2018/0081908 A1 | 3/2018 | Matsubara et al. | |

OTHER PUBLICATIONS

Singaporean Written Opinion and Search Report received in corresponding Singaporean Application No. 10201904328U dated Nov. 7, 2019.
Japanese Office Action received in corresponding Japanese Application No. 2018-176204 dated Jul. 27, 2021.

* cited by examiner

INFORMATION PROCESSING SYSTEM, METHOD FOR CONTROLLING INFORMATION PROCESSING SYSTEM, AND STORAGE MEDIUM

CLAIM OF PRIORITY

The present application claims priority from Japanese patent application JP2018-176204 filed on Sep. 20, 2018, the content of which is hereby incorporated by reference into this application.

BACKGROUND OF THE INVENTION

The present invention relates to a technique for processing an image captured of a moving object.

In recent years, with an increase in violent crime and an increase in security consciousness, many surveillance cameras tend to be installed in locations where people gather such as shops, airports, and roads. Video captured by these surveillance cameras is stored in a storage device such as a surveillance recorder, and viewed as necessary. Also, with the spread of IP cameras, it is possible to connect many cameras through a network, and as a result of increased capacity of storage devices, a large quantity of video can be stored. Thus, it is very difficult to visually confirm all video data as was done conventionally.

Various similarity search techniques for searching and displaying video where a specific person or object appears from among a large quantity of video data have been proposed. Similarity search techniques refer to techniques for searching, from among target data, data similar to a search query made by a user, and displaying the results. In particular, similarity search techniques refer to techniques in which feature values such as the hue and shape extracted from the image itself as well as the composition are used to search for data with a high degree of similarity between feature values.

An example of a similarity search technique for searching for a person within captured image is the technique disclosed in JP 2009-42879 A (Patent Document 1), for example. Patent Document 1 states that "Feature value information indicating feature values of a person in captured images captured by a plurality of cameras is acquired. On the basis of the acquired feature value information, the difference between the feature value of a first person captured by a first camera and the feature value of a second person captured by a second camera is calculated for each feature value. A narrow-down effectiveness indicating the effectiveness when searching the first person is calculated for each feature value of the person on the basis of the calculated difference in feature values."

SUMMARY OF THE INVENTION

Patent Document 1 discloses a method for narrowing down search results by efficiently eliminating unneeded images from multiple images attained by a search. However, if performing a similarity search with images captured of a person as search queries, there are cases in which images captured from a different angle than the search queries, images in which the person is wearing different attire or is holding different personal belongings, or the like cannot be attained as search results even if the images are of the same person. Even if the search results are to be narrowed in the end, it is preferable that a search be performed such that images that capture persons that have the possibility of being the same person as the one being searched are not omitted.

In order to solve at least one of the foregoing problems, provided is an information processing system, comprising: a processor; a storage device coupled to the processor; and a display device coupled to the processor, wherein the storage device stores a plurality of images captured by a plurality of imaging devices, wherein if an image of a moving object is selected as a search query, then the processor executes a similarity search on the plurality of images stored in the storage device, with the selected image as the search query, wherein the display device displays a plurality of images attained as results of the similarity search, wherein if an image of a moving object is added as a search query, then the processor executes a similarity search with all selected images as search queries, and wherein the display device updates images to be displayed such that a plurality of images attained as results of the similarity search performed with all the selected images as the search queries are displayed.

According to one aspect of the present invention, the coverage of the search for the moving object is improved, and is possible to track the moving object with ease.

Problems, configurations, and effects other than what was described above are made clear by the description of embodiments below.

DETAILED DESCRIPTION OF EMBODIMENTS

Below, a moving object tracking system according to an embodiment of the present invention will be described with reference to drawings.

Figure 1:
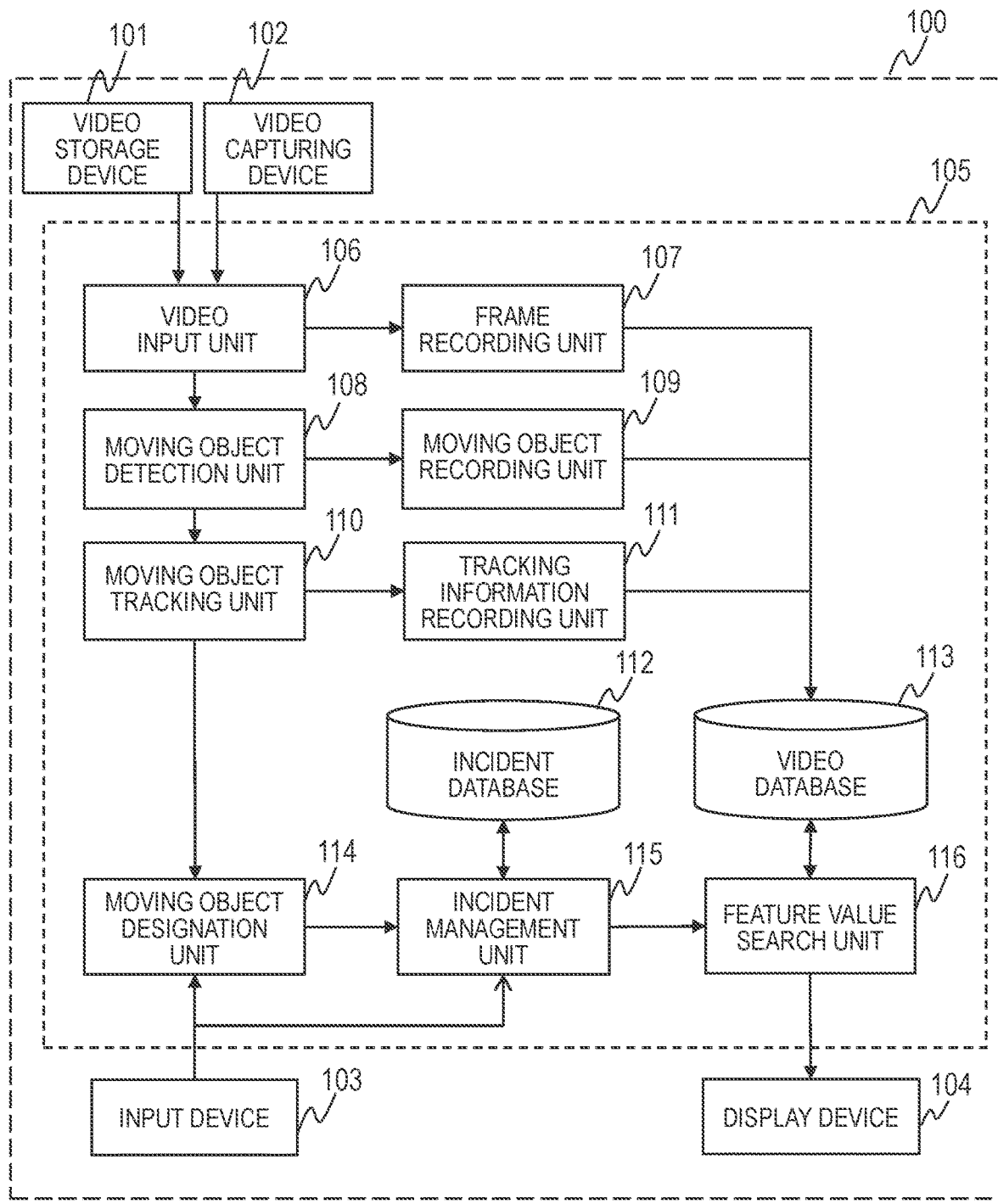
FIG. 1 is a block diagram showing an overall configuration of a moving object tracking system according to an embodiment of the present invention.

FIG. 1 is a block diagram showing an overall configuration of a moving object tracking system 100 according to an embodiment of the present invention.

The moving object tracking system 100 of the present embodiment is an information processing system including a video storage device 101, a video capturing device 102, an input device 103, a display device 104, and a server computer 105. The video storage device 101 is a storage medium that stores video data and outputs the video data by request, and is constituted of a hard disk drive installed in a computer or a network-connected storage system such as network attached storage (NAS) or a storage area network (SAN).

The video capturing device 102 captures video and creates video data, and outputs the video data.

An image outputted from the video storage device 101 or the video capturing device 102 is inputted to a video input unit 106 (mentioned later) of the server computer 105. The moving object tracking system 100 may include both the video storage device 101 and the video capturing device 102 as shown in FIG. 1, or may include either one thereof. If a moving object tracking system 100 includes both the video storage device 101 and the video capturing device 102, then the input source for the video data to the video input unit 106 may be switched to either of the video storage device 101 or the video capturing device 102, or the video data outputted from the video capturing device 102 may be temporarily stored in the video storage device 101 and then inputted to the video input unit 106. In such a case, the video storage device 101 may be cache memory that temporarily stores video data continuously inputted from the video capturing device 102, for example.

As long as the video data stored in the video storage device 101 and the video data created by the video capturing device 102 can be used to track a moving object that is being imaged, then the video data may be of any format. For example, the video capturing device 102 may be an analog camera or an IP camera with the moving image data captured thereby being outputted as video data, and such video data may be stored in the video storage device 101. Alternatively, the video capturing device 102 may be a still camera with a series of still image data captured at a prescribed interval (an interval at which the imaged object can at least be tracked) being outputted as video data, and such video data may be stored in the video storage device 101.

The input device 103 is an input interface such as a mouse, keyboard, or touch device for transmitting user operations to the server computer 105. The display device 104 is an output interface such as a liquid crystal display that is used in order to display search results from the server computer 105, perform interactive operations with the user, or the like. The input device 103 and the display device 104 may be integrated by using a so-called touch panel or the like, for example. A search screen 501 to be described later (FIG. 5) is displayed by the display device 104, and buttons in the search screen are operated by the user operating the input device 103.

The server computer 105 functions as a moving object tracking device that tracks a desired moving object from inputted video data on the basis of search conditions specified by the user. Specifically, the server computer 105 tracks a moving object included in each frame of the provided video data, and accumulates information pertaining to the moving object. When the user designates search conditions for a moving object to be searched from the frames, the server computer 105 searches the images using the accumulated information. The video handled by the server computer 105 is assumed to be fixed perspective video captured at one or more locations. The object being tracked is a given moving object such as a person or a vehicle. Also, any articles or the like carried by the person can be considered moving objects as well.

The server computer 105 includes the video input unit 106, a frame recording unit 107, a moving object detection unit 108, a moving object recording unit 109, a moving object tracking unit 110, a tracking information recording unit 111, an incident database 112, a video database 113, a moving object designation unit 114, an incident management unit 115, and a feature value search unit 116.

The video input unit 106 reads in video data from the video storage device 101 or receives video data captured by the video capturing device 102, and converts it to a data format that can be used internally in the server computer 105. Specifically, the video input unit 106 performs a video decoding process that divides the video (moving image data format) into frames (still image data format). The acquired frames are transmitted to the frame recording unit 107 and the moving object detection unit 108. If frames rather than video can be acquired from the video storage device 101 or the video capturing device 102, then the acquired frames may be used.

The frame recording unit 107 writes the extracted frames and information of the video from which the frames were extracted to the video database 113. Details of the data recorded in the video database 113 will be described later in describing FIG. 3.

The moving object detection unit 108 detects moving objects that are being imaged. The moving object can be detected using any method including a publicly known method, for example.

The moving object recording unit 109 extracts feature values from the detected moving object and records the extracted feature values in the video database 113.

The moving object tracking unit 110 tracks a moving object by associating it with a moving object in the previous frame. The moving object can be tracked using any method including a publicly known method, for example. Tracking information is constituted of coordinate information of the moving object in each frame, and an ID (tracking ID) uniquely assigned to each object being tracked (see FIG. 3).

The tracking information recording unit 111 records the assigned tracking ID to the video database 113.

The video database 113 is a database for storing video, frames, tracking information of the moving object, and the like. The video database 113 is accessed by the recording process performed by the frame recording unit 107, the moving object recording unit 109, and the tracking information recording unit 111; and the search process performed by the feature value search unit 116. The structure of the video database 113 will be described in detail later together with FIG. 3.

The incident database 112 stores information generated by a tracking operation by the user. The incident database 112 is accessed when the incident management unit 115 performs a recording process and an information acquisition process. The structure of the incident database 112 will be described in detail later together with FIG. 4.

The moving object designation unit 114 receives from the input device 103 a moving object (bounding rectangle of a person, for example) selected by the user.

The incident management unit 115 records information that triggered the operation when the user starts the operation. If an abandoned article is discovered using an unattended article detection technique, then the camera ID of the camera that detected the article, the time at which the article was detected, and the like are recorded in the incident database 112. Also, if an operation assigning a tag to a moving object determined by the user to be correct tracking results is performed when tracking a moving object, the incident management unit 115 assigns the tag information to the corresponding moving object and records these in the incident database 112. Details thereof will accompany later descriptions of FIGS. 9 and 10.

The feature value search unit 116 searches the video database 113 for feature values similar to search feature values extracted from the moving object, and outputs the results to the display device 104.

Figure 2:
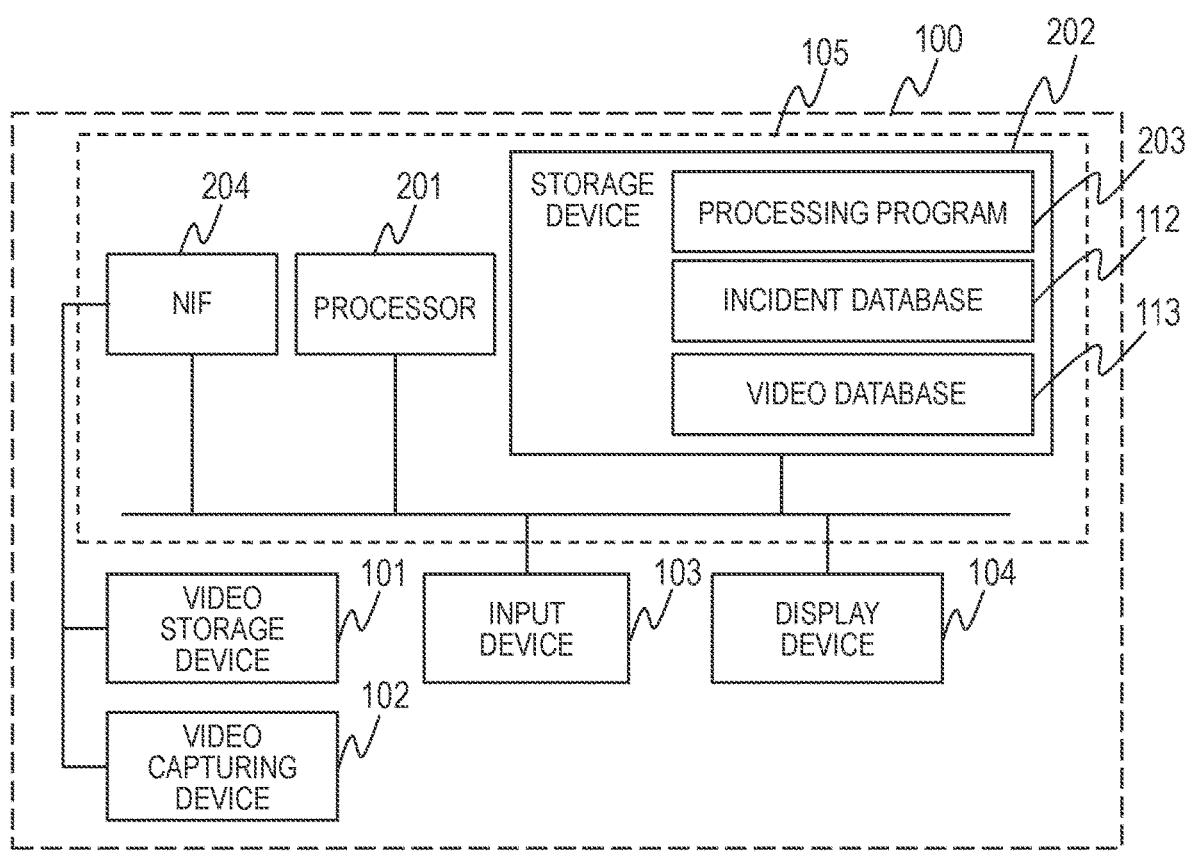
FIG. 2 is a block diagram showing a hardware configuration of the moving object tracking system according to an embodiment of the present invention.

FIG. 2 is a block diagram showing a hardware configuration of the moving object tracking system 100 according to an embodiment of the present invention.

The server computer 105 is a typical computer having a processor 201 and a storage device 202 that are connected to each other, for example. The storage device 202 is constituted of a storage medium of any type. The storage device 202 may include a semiconductor memory and a hard disk drive, for example.

In this example, function units such as the video input unit 106, the frame recording unit 107, the moving object detection unit 108, the moving object recording unit 109, the moving object tracking unit 110, the tracking information recording unit 111, the moving object designation unit 114, the incident management unit 115, and the feature value search unit 116 shown in FIG. 1 are realized by the processor 201 executing processing programs 203 stored in the storage device 202.

In other words, in the present embodiment, the processes executed by the respective function units are in reality executed by the processor 201 according to commands coded in the processing programs 203. Also, the incident database 112 and the video database 113 are included in the storage device 202. The display device 104 displays images by the processor 201 generating data to be displayed and outputting the data to the display device 104, and the display device 104 performing display according to the data.

The server computer 105 further includes a network interface device 204 (NIF) connected to the processor 201. The video capturing device 102 is connected to the server computer 105 through the network interface device 204, for example. The video storage device 101 may be network-attached storage (NAS) or a storage area network (SAN) connected to the server computer 105 through the network interface device 204, or may be included in the storage device 202.

Figure 3:
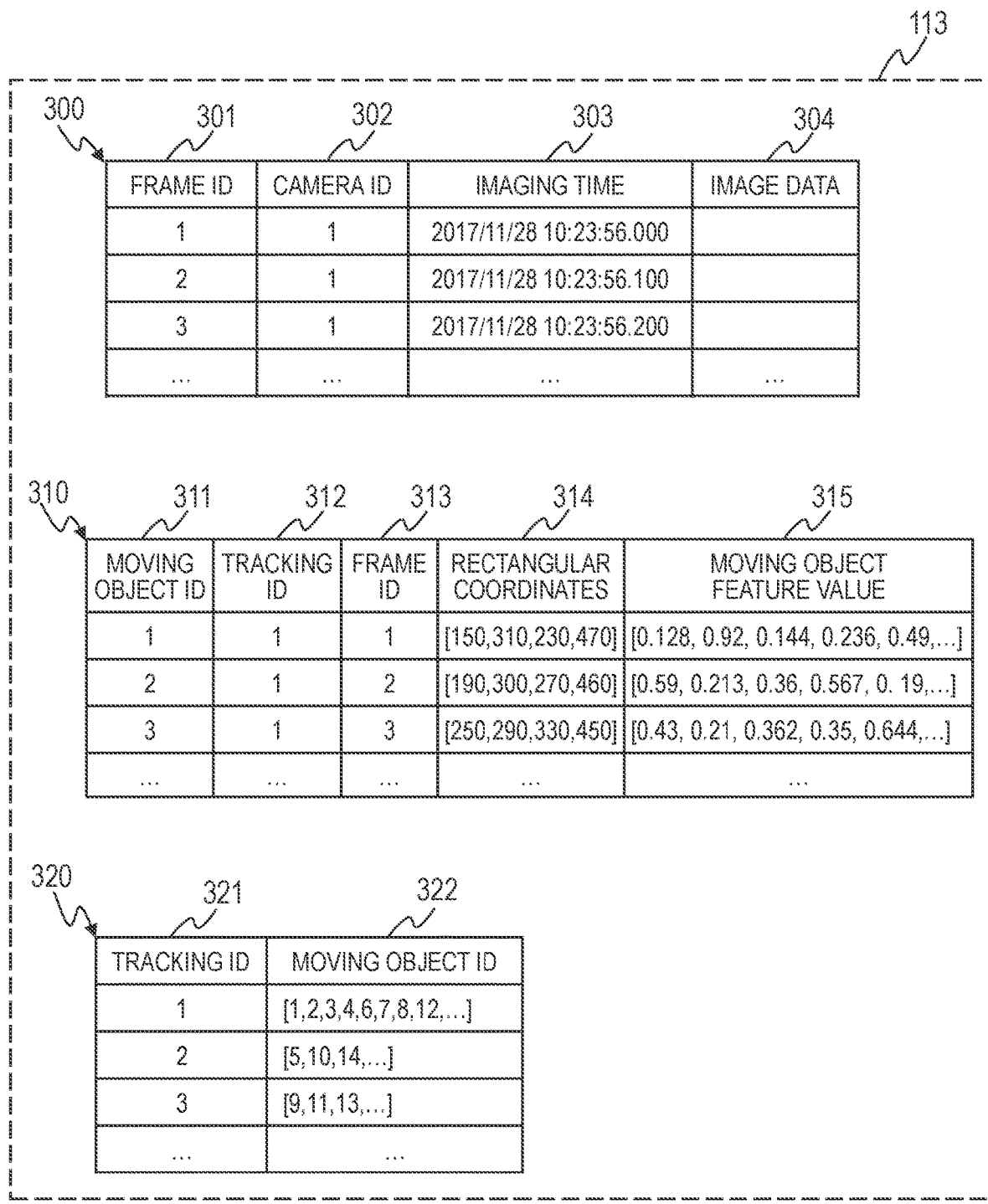
FIG. 3 is a descriptive drawing of a configuration and a data example of a video database according to an embodiment of the present invention.

FIG. 3 is a descriptive drawing of a configuration and a data example of the video database 113 according to an embodiment of the present invention. Here, a configuration example of a table format is shown but the data format is not limited to a table format and any data format may be used.

The video database 113 includes image data management information 300, moving object management information 310, and tracking information management information 320, which are shown in FIG. 3. The table configuration and the field configuration of each table in FIG. 3 are configurations necessary for implementing the present invention, and tables and fields may be added according to the application.

The image data management information 300 has a frame ID field 301, a camera ID field 302, an imaging time field 303, and an image data field 304.

The frame ID field 301 retains identification information (hereinafter, "frame ID") of frame image data extracted from the video data.

The camera ID field 302 retains identification information (hereinafter, "camera ID") of the video capturing device 102. If video data is read in from the video storage device 101, then the camera ID may be omitted, or identification information of a video file (hereinafter, "video ID") may be retained.

The imaging time field 303 retains information of the time at which the image was captured.

The image data field 304 retains binary data of a still image of a frame. This data is used when displaying search results or the like in the display device 104. The image data field 304 may retain not only original image data but thumbnail images as well.

The moving object management information 310 includes a moving object ID field 311, a tracking ID field 312, a frame ID field 313, a rectangular coordinate field 314, and a moving object feature value 315.

The moving object ID field 311 retains a list of identification information of moving bodies (hereinafter, "moving object ID") detected in each frame. Here, the moving object ID does not identify the moving object itself but rather identifies images of the moving object detected in each frame. If the same moving object is detected in a plurality of frames, then a (unique) moving object ID is assigned to each of the images of the moving object, and those moving object Ids are associated with one tracking ID.

The tracking ID field 312 retains the aforementioned tracking ID associated with the moving object IDs.

The frame ID field 313 retains the frame IDs of frame images from which each moving object was detected. The frame ID corresponds to what is retained in the frame ID field 301 of the image data management information 300.

The rectangular coordinate field 314 retains rectangular coordinates indicating the range of the frame image taken up by the image of the moving object detected in each frame. The coordinates may be expressed in the format of "upper left corner horizontal coordinate, upper left corner vertical coordinate, lower right corner horizontal coordinate, lower right corner vertical coordinate" of a circumscribed rectangle of the moving object, or may be expressed as the widths and heights of the horizontal coordinate of the upper left corner of the rectangle and the vertical coordinate of the upper left corner, for example.

The moving object feature value 315 is a feature value extracted from the rectangle in the image, and is vector data. The moving object feature value 315 may be color information, shape information, or the like, or may be a feature value extracted by deep learning, for example.

The tracking information management information 320 has a tracking ID field 321 and a moving object ID field 322.

The tracking ID field 321 corresponds to what is retained in the tracking ID field 312 of moving object management information 310.

The moving object ID field 322 retains a list of moving object IDs assigned to the same tracking ID. The moving object ID field 322 corresponds to what is retained in the moving object ID field 311 of the moving object management information 310.

As shown in FIG. 3, for example, the fact that "1, 2, 3, 4, 6, 7, 8, 12, . . . " are recorded in the moving object ID field 322 corresponding to the tracking ID "1" signifies that an image of a moving object identified by the moving object ID "1" detected in a given frame, an image of a moving object identified by the moving object ID "2" detected in another frame, and images of moving objects identified by the moving object IDs "3", "4", "6", "7", "8", "12", etc. that are similarly detected in separate frames are associated with each other by the moving object tracking unit 110 (that is, these images were determined to be of the same moving object).

An example of a method for tracking a moving object is one in which image feature values are extracted from an image having a moving object ID of "1" detected in a given frame and an image having a moving object ID of "4" detected in another frame, calculating the degree of similarity (distance) between the image feature values, and if the degree of similarity is greater than or equal to a threshold, determining that the moving objects of both images are the same moving object. Also, a method may be adopted in which, according to the movement direction and speed of the moving object in frames up to a certain time, the location at which the moving object would appear in a frame at a later time is estimated, and if the distance between the estimation results and the actual location at which the moving object appeared is less than a prescribed standard, then these moving objects are determined to be the same moving object.

Figure 4:
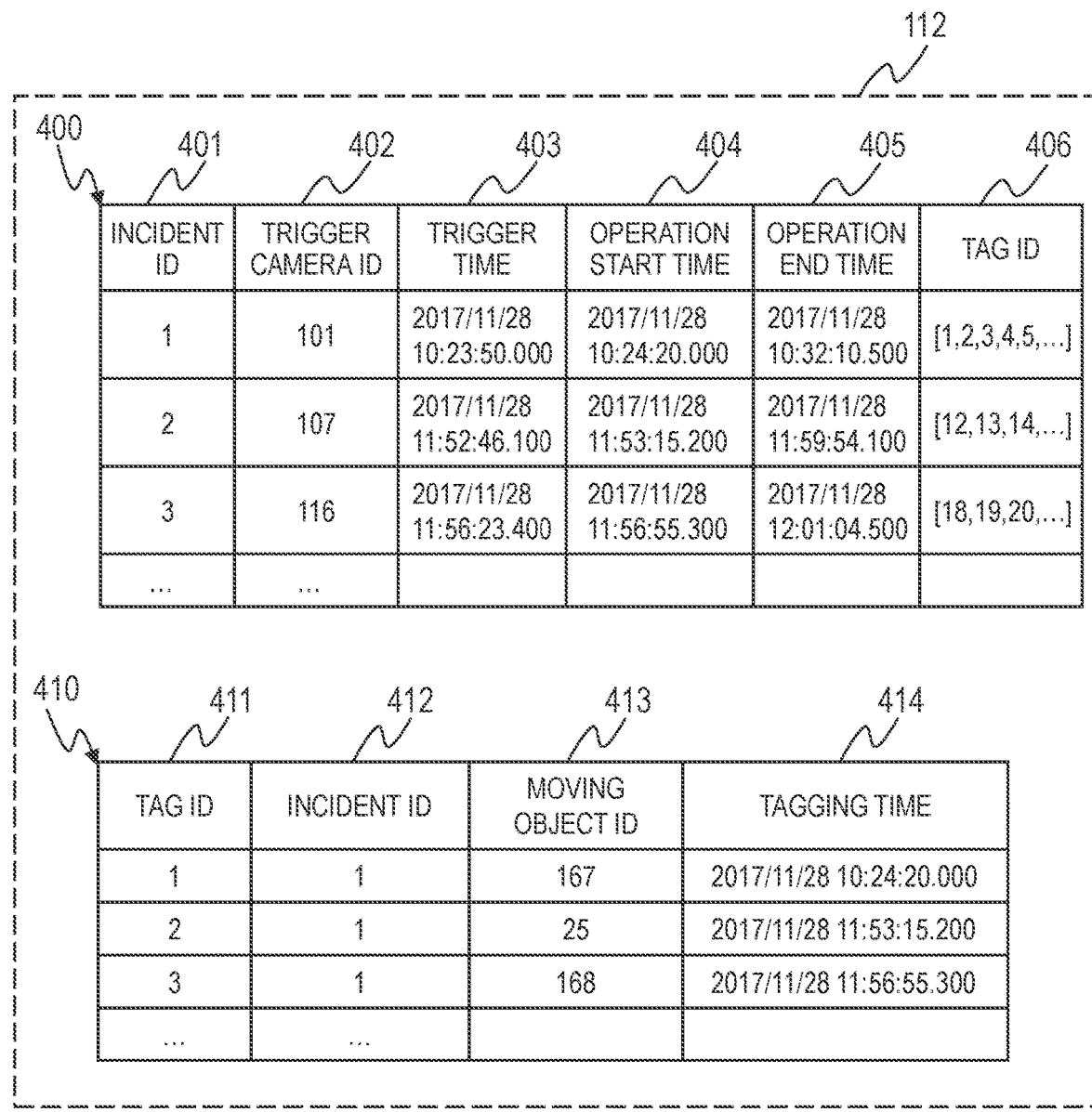
FIG. 4 is a descriptive drawing of a configuration and a data example of an incident database according to an embodiment of the present invention.

FIG. 4 is a descriptive drawing of a configuration and a data example of the incident database 112 according to an embodiment of the present invention. Here, a configuration example of a table format is shown but the data format is not limited to a table format and any data format may be used.

The incident database 112 includes incident management information 400 and tag management information 410, which are shown in FIG. 4. The table configuration and the field configuration of each table in FIG. 4 are configurations necessary for implementing the present invention, and tables and fields may be added according to the application.

The incident management information 400 has an incident ID field 401, a trigger camera ID field 402, a trigger time field 403, an operation start time field 404, an operation end time field 405, and a tag ID field 406.

The incident ID field 401 stores identification information of a detected incident (hereinafter, "incident ID"). Here, an incident is defined as an event for which an operation such as a search of a moving object is to be performed. For example, if the presence of an unclaimed article is detected, and an operation is performed to search for the individual who left behind the article, the leaving behind of the article is an incident.

Below, the leaving behind of an article will be primarily used as an example of an incident but incidents to be handled by the moving object tracking system 100 are not limited thereto. For example, a given event such as the fact that a certain action was taken, or that a specific person was present can be handled as an incident, and the following process can be applied thereto.

The trigger camera ID field 402 and the trigger time field 403 retain, respectively, a camera ID for identifying the video capturing device 102 that captured the image that served as a trigger for detecting the incident (hereinafter, "trigger camera ID") and an imaging time at which the image was captured (hereinafter, "trigger time"). If the presence of an unclaimed article is detected, such as described above, for example, then the camera ID that identifies the video capturing device 102 that captured the image in which that article was first discovered, and the imaging time are respectively retained in the trigger camera ID field 402 and the trigger time field 403.

The operation start time field 404 and the operation end time field 405 respectively retain the start time and the end time of the operation executed for the incident. If, as described above, an unclaimed article is discovered, and an operation is performed such as to search for images to find the individual who left behind the article, for example, then the time at which the operation was started and the time at which the operation was ended are retained in the operation start time field 404 and the operation end time field 405, respectively.

The tag ID field 406 retains identification information for a tag (hereinafter, "tag ID") assigned to the moving object in the image during the operation.

The tag management information 410 has a tag ID field 411, an incident ID field 412, a moving object ID field 413, and a tagging time field 414.

The tag ID field 411 retains a tag ID for identifying each tag. The tag ID corresponds to what is retained in the tag ID field 406 of the incident management information 400.

The incident ID field 412 stores an incident ID for identifying an incident corresponding to each tag. The incident ID corresponds to what is retained in the incident ID field 401 of the incident management information 400.

The moving object ID field 413 retains a moving object ID for identifying a moving object to which each tag is assigned. The moving object ID corresponds to what is retained in the moving object ID field 311 of the moving object management information 310.

The tagging time field 414 retains a time at which each tag was assigned.

If, for example, the presence of an unclaimed article is detected, an incident ID of "1" is assigned to this event, and an operation to search for the individual who left behind this article is started, then when a tag is assigned to a moving object included in an image searched during the operation, the ID of the tag, the ID "1" of the incident, the ID of the moving object, and the time at which the tag was assigned are retained, respectively, in the tag ID field 411, the incident ID field 412, the moving object ID field 413, and the tagging time field 414.

Figure 5:
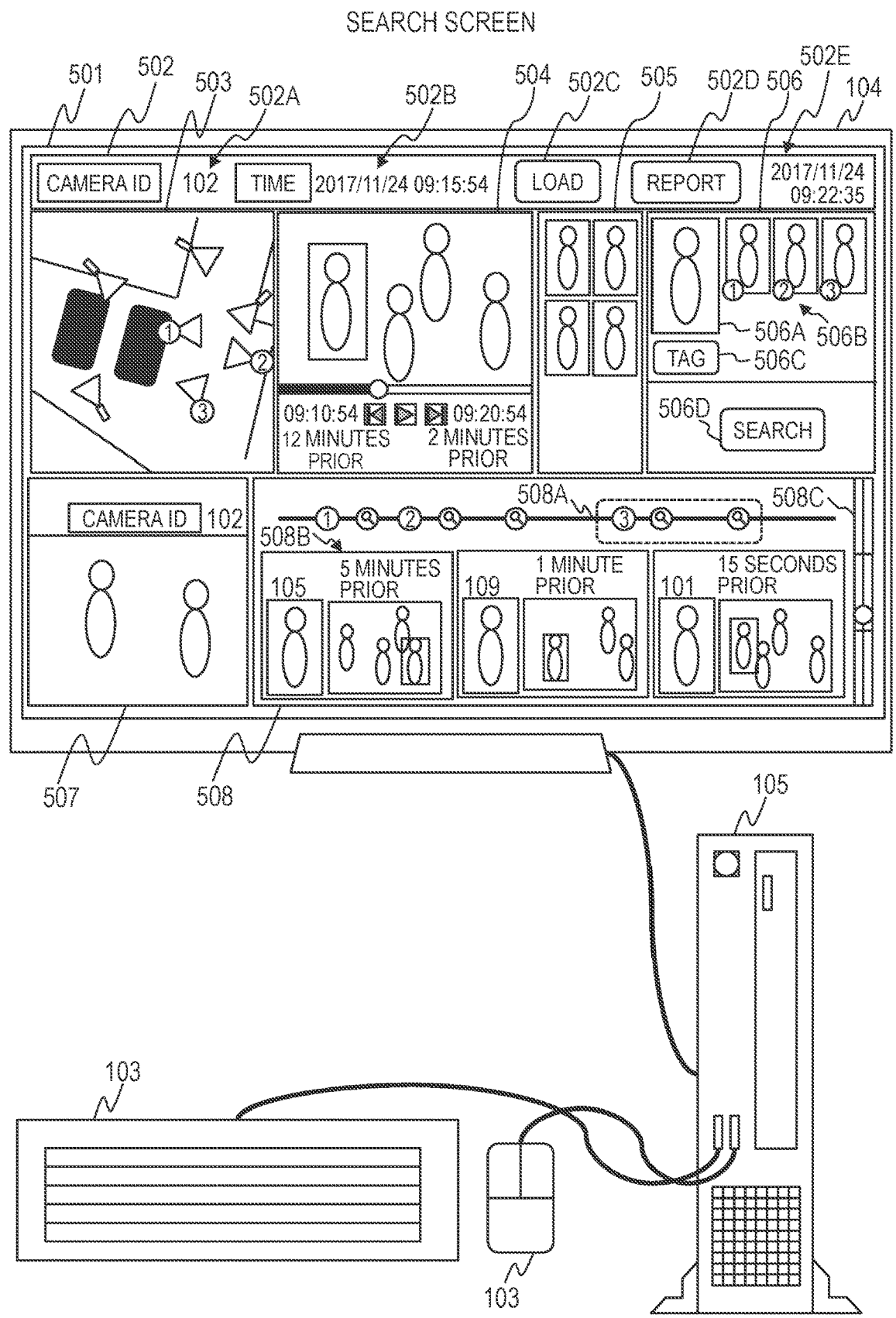
FIG. 5 is a descriptive drawing of a search screen outputted by the moving object tracking system according to an embodiment of the present invention.

FIG. 5 is a descriptive drawing of a search screen outputted by the moving object tracking system 100 according to an embodiment of the present invention.

The search screen 501 shown in FIG. 5 is generated by the server computer 105 and displayed in the display device 104, and includes a command area 502, a map area 503, a camera image area 504, a candidate image area 505, a tag image area 506, a live image area 507, and a search result display area 508.

The command area 502 displays a trigger camera ID 502A, a trigger time 502B, a load button 502C, a report button 502D, and a current time 502E.

Figure 7:
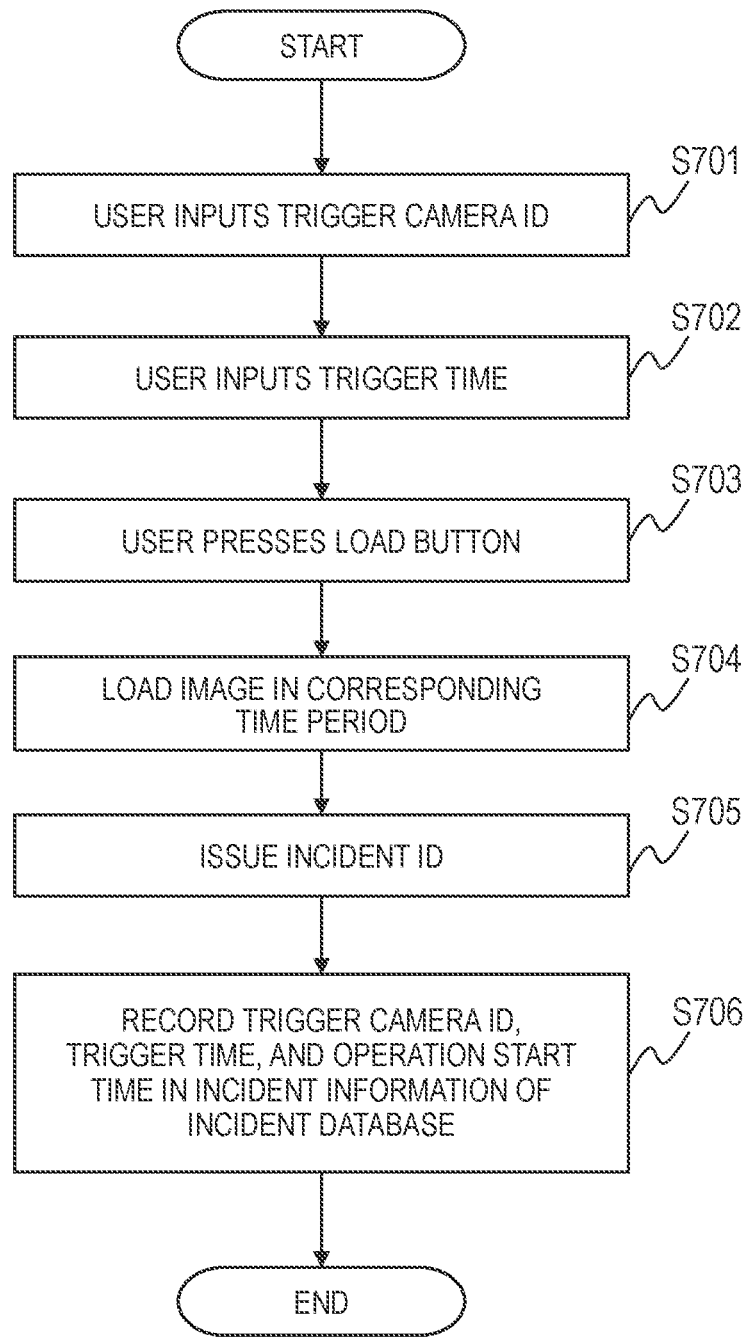
FIG. 7 is a flowchart of a video loading process to be executed by the moving object tracking system according to an embodiment of the present invention.

When the user inputs the trigger camera ID 502A and the time 502B and operates the load button 502C, the moving object tracking system 100 starts a video loading process (see FIG. 7). Also, when the user operates the report button 502D after the operation is finished, the moving object tracking system 100 creates and outputs a report pertaining to the executed operation. If the person being tracked is found and the operation ends, then a report to that effect is created, for example.

The map area 503 displays a map of at least a portion of the space to be tracked by the moving object tracking system 100. In the example of FIG. 5, the installation positions of the video capturing devices 102 and the respective imaging directions are displayed on a plan view figure of the space.

The image loaded when the trigger camera ID and the trigger time are inputted to the camera image area 504 and the load button 502C is pressed, is displayed. If images are loaded of frames captured by the video capturing device 102 identified by the trigger camera ID during a prescribed time period including the trigger time (10 minute period of 5 minutes prior to 5 minutes after the trigger time, for example), then one of the images is displayed in the camera image area 504.

A configuration may be adopted in which an image of a frame captured at the trigger time is displayed and then an image of a frame at a given time within the loaded time is displayed according to user operation, for example. In order to enable such an operation, the camera image area 504 may include a seek bar, a play button, a fast forward button, and a rewind button. Additionally, the start and end times of the loaded time period as well as the differences between the respective times and the current time (how many minutes prior to the current time each time is, for example) may be displayed. Also, the displayed images of the frames may include an image of the moving object detected by the moving object detection unit 108, such as the circumscribed rectangle of the detected moving object.

The candidate image area 505 displays an image of the moving object designated by the user from among the moving objects included in the images of the frames displayed in the camera image area 504. If the user designates any of the moving objects displayed in the camera image area 504, for example, then an image of the circumscribed rectangle of the moving object may be displayed in the candidate image area 505, and additionally, an image of a circumscribed rectangle of the same moving object as the moving object (that is, a moving object assigned the same tracking ID as that moving object) included in an image of a frame at another loaded time may be displayed in the candidate image area 505.

The tag image area 506 includes a selected image area 506A, a tag display area 506B, a tagging button 506C, and a search button 506D. The selected image area 506A displays an image selected by the user from the candidate image area 505. When the user presses the tagging button 506C, a new tag is assigned to the moving object in the selected image, and that image is displayed in the tag display area 506B. These images are displayed in the order in which they were captured regardless of the order in which they were tagged. If an image with a new tag is added, then the display of the tag display area 506B is updated according to the imaging time.

The images in the tag display area 506B may further display the assigned tag number. In the example of FIG. 5, the moving objects of three images are tagged, and are displayed with a number of "1" to "3". These numbers indicate the chronological order in which the images of the tagged moving objects were captured.

If the image of the moving object is tagged, then the installation location in the map area 503 of the video capturing device 102 that captured the image may be displayed with the tag number.

When the user presses the search button 506D, a similarity search in which the feature value of the tagged image is used as a search query is executed. If there is no tagged image in the tag display area 506B, then a similarity search in which the feature value of the image in the selected image area 506A is used as the search query may be executed.

The live image area 507 displays image (live image) currently being captured by the video capturing device 102 identified by the trigger camera ID. If the incident is that an article was abandoned, for example, then the user can see the current state of the abandoned article by viewing this image. Also, by the user selecting a camera ID, it is possible to switch the image displayed in the live image area 507 to that of the desired video capturing device 102.

The search result display area 508 displays results of the executed search. Specifically, a search result icon is displayed at a position on the timeline 508A corresponding to the time at which the image attained by the search was captured. In the example of FIG. 5, a magnifying glass symbol is displayed as the search result icon. The symbols showing the numbers "1" to "3" indicate the time at which the tagged images were captured. These numbers are tag numbers (that is, numbers indicating the chronological order in which the images were captured). If a new tag is assigned to an image attained as a search result, then the icon corresponding to this image is switched from the magnifying glass symbol to a symbol indicating the tag number.

The display range of the images (broken line frame in the example of FIG. 5) is displayed on the timeline 508A, and images corresponding to icons in the display range are displayed in the image display area 508B. The user can change the display range of the images as desired, thereby viewing images in search results at the desired times.

The image display area 508B corresponding to each icon displays an image of the circumscribed rectangle of the moving object in the search result corresponding to the icon, an image of a frame including the foregoing image, the camera ID for identifying the video capturing device 102 that captured this image, and the imaging time. As the imaging time, the time itself may be displayed, or the amount of time from the current time ("5 minutes prior", etc.) may be displayed.

If, for example, an incident in which an article is abandoned is currently occurring, and the person who abandoned the article is being searched, then by displaying the amount of time from the current time (the time elapsed from when the image was captured to the current time), it would be easy to narrow down the search radius by estimating the range within which the person could be present. On the other hand, there are cases in which it is better to display the imaging time such as if incidents that occurred in the past are being analyzed with reference to past video stored in the video storage device 101.

Furthermore, the user can operate a threshold bar 508C in the search result display area 508 to set a similarity threshold when performing a similarity search.

Figure 6:
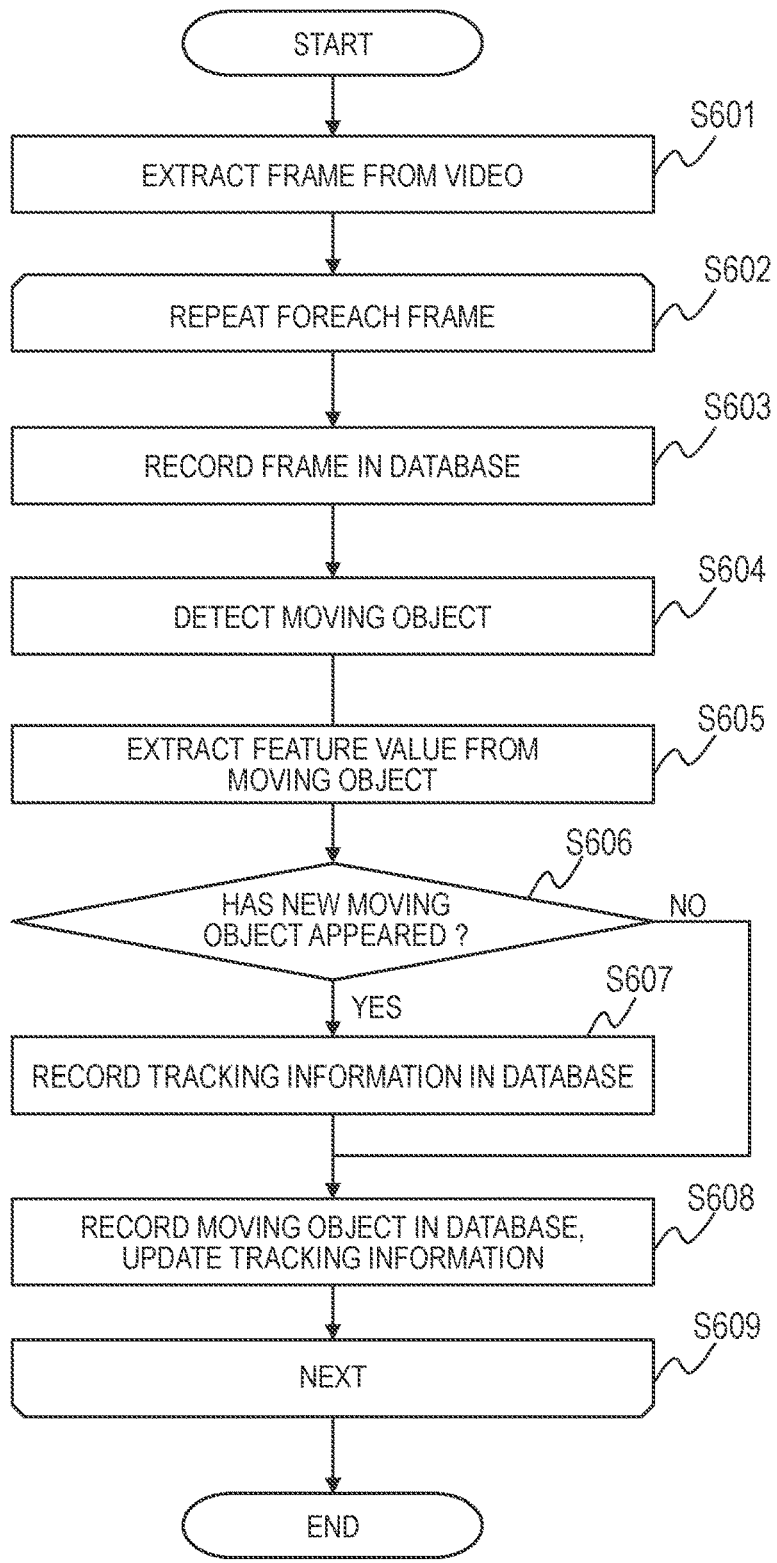
FIG. 6 is a flowchart of a video recording process to be executed by the moving object tracking system according to an embodiment of the present invention.

FIG. 6 is a flowchart of a video recording process to be executed by the moving object tracking system 100 according to an embodiment of the present invention.

First, the video input unit 106 extracts a plurality of frames from an image inputted from the video storage device 101 or the video capturing device 102 (step S601). Next, the moving object tracking system 100 executes the process of steps S603 to S608 on each of the extracted frames (step S602, S609).

First, the frame recording unit 107 records the frame in the video database 113 (step S603). As a result, one record is added to the image data management information 300, and the camera ID identifying the video capturing device 102 that captured the frame, the frame ID for identifying the frame, the time at which the frame was captured, and the image data of the frame are retained, respectively, in the frame ID field 301, the camera ID field 302, the imaging time field 303, and the image data field 304.

Next, the moving object detection unit 108 detects a moving object from the frame (step S604). This detection can be performed using any method such as a publicly known method, for example, and thus, detailed descriptions thereof are omitted.

Next, the moving object tracking unit 110 extracts feature values from the moving object (step S605). If a plurality of moving objects were detected in step S604, the moving object tracking unit 110 extracts feature values from each of the moving objects.

Next, the moving object tracking unit 110 determines if a new moving object has appeared (step S606). The moving object tracking unit 110 may determine, on the basis of the feature values extracted in step S605, whether each moving object detected in the frame in step S604 is the same as any moving object detected in a frame captured at a prior time by the same video capturing device 102, for example. It may be determined that the moving object is new if any of the moving objects detected in the frame is not the same as any moving object detected in a frame captured at a prior time by the same video capturing device 102.

If the moving object tracking unit 110 has determined that a new moving object has appeared (step S606: YES), then tracking information corresponding to the newly appeared moving object is recorded in a database (step S607). Specifically, the moving object tracking unit 110 adds a new record to the tracking information management information 320 and records a new tracking ID in the tracking ID field 321. On the other hand, the moving object tracking unit 110 does not execute step S607 if it has determined that no new moving object has appeared (step S606: NO).

Next, the moving object detected by the moving object recording unit 109 is recorded in the database and the tracking information recording unit 111 updates the tracking information (step S608). Specifically, the moving object recording unit 109 records the moving object ID for identifying each moving object detected in step S604, the frame ID for identifying the frame in which each moving object was detected, rectangular coordinates indicating the position and range of each moving object in the frame, and the feature value extracted in step S605 from each moving object, respectively, in the moving object ID field 311, the frame ID field 313, the rectangular coordinate field 314, and the moving object feature value field 315.

If it is determined that each moving object is the same as a moving object detected in a frame at a prior time, then the moving object recording unit 109 records the same tracking ID in the tracking ID field 312. Then, the tracking information recording unit 111 adds the moving object ID for identifying each moving object to the moving object ID field 322 of the tracking information management information 320 corresponding to the tracking ID.

On the other hand, if it is determined that any of the moving objects is not the same as any of the moving objects detected in a frame at a prior time (that is, a new moving object has appeared), then the tracking information recording unit 111 records a moving object ID for identifying the newly appeared moving object in the moving object ID field 322 in the record, of the tracking information management information 320, added in step S607. Then, the moving object recording unit 109 records the tracking ID recorded in the tracking ID field 321 of the record added in step S607 to the tracking ID field 312 corresponding to the newly appeared moving object.

When the process of steps S603 to S608 has ended for all frames extracted in step S601, then the video recording process ends.

FIG. 7 is a flowchart of a video loading process to be executed by the moving object tracking system 100 according to an embodiment of the present invention.

First, the user inputs the trigger camera ID and the trigger time to the moving object tracking system 100 (steps S701, S702) and presses the load button 502C (step S703). For example, the user operates the input device 103, inputs the trigger camera ID 502A and the trigger time 502B to the command area 502 of the search screen 501 shown in FIG. 5, and presses the load button.

Specifically, a configuration may be adopted in which, if the user discovers an abandoned article by viewing video captured by any of the video capturing devices 102, then the camera ID of the video capturing device 102 and the time at which the video was captured are inputted to the trigger camera ID 502A and the trigger time 502B, respectively. Alternatively, a configuration may be adopted in which, if the user confirms video captured of an abandoned article by viewing past video according to a report from the location where the article was abandoned, then the camera ID of the video capturing device 102 that captured the video and the time at which the video was captured are inputted to the trigger camera ID 502A and the trigger time 502B, respectively.

In the above examples, the user manually inputs the trigger camera ID 502A and the trigger time 502B and presses the load button, but alternatively, the trigger camera ID and the trigger time may be passed as URL parameters and thereby automatically loaded.

Next, the feature value search unit 116 loads feature values pertaining to images of the corresponding time period from the video database 113 (step S704). The feature values loaded herein may include information such as the camera ID and the time, image feature values extracted from the image, and various types of data of the image itself or the like, for example. Also, the time period may be of a prescribed length determined with reference to the trigger time (10 minute period from 5 minutes before to 5 minutes after the trigger time, for example), for example, or may be a time period set manually by the user every time the feature values are loaded. In the case of the latter scenario, the search screen 501 may include a GUI for setting the time period.

Next, the incident management unit 115 issues an incident ID (step S705).

Then, the incident management unit 115 records the trigger camera ID, the trigger time, and the operation start time in the incident management information 400 of the incident database 112 (step S706). Specifically, the incident management unit 115 records the incident ID issued in step S705 in the incident ID field 401 of a new record of the incident management information 400, and records the inputted trigger camera ID, the inputted trigger time, and the current time in the trigger camera ID field 402, the trigger time field 403, and the operation start time field 404, respectively.

The video loading process is then complete.

Figure 8:
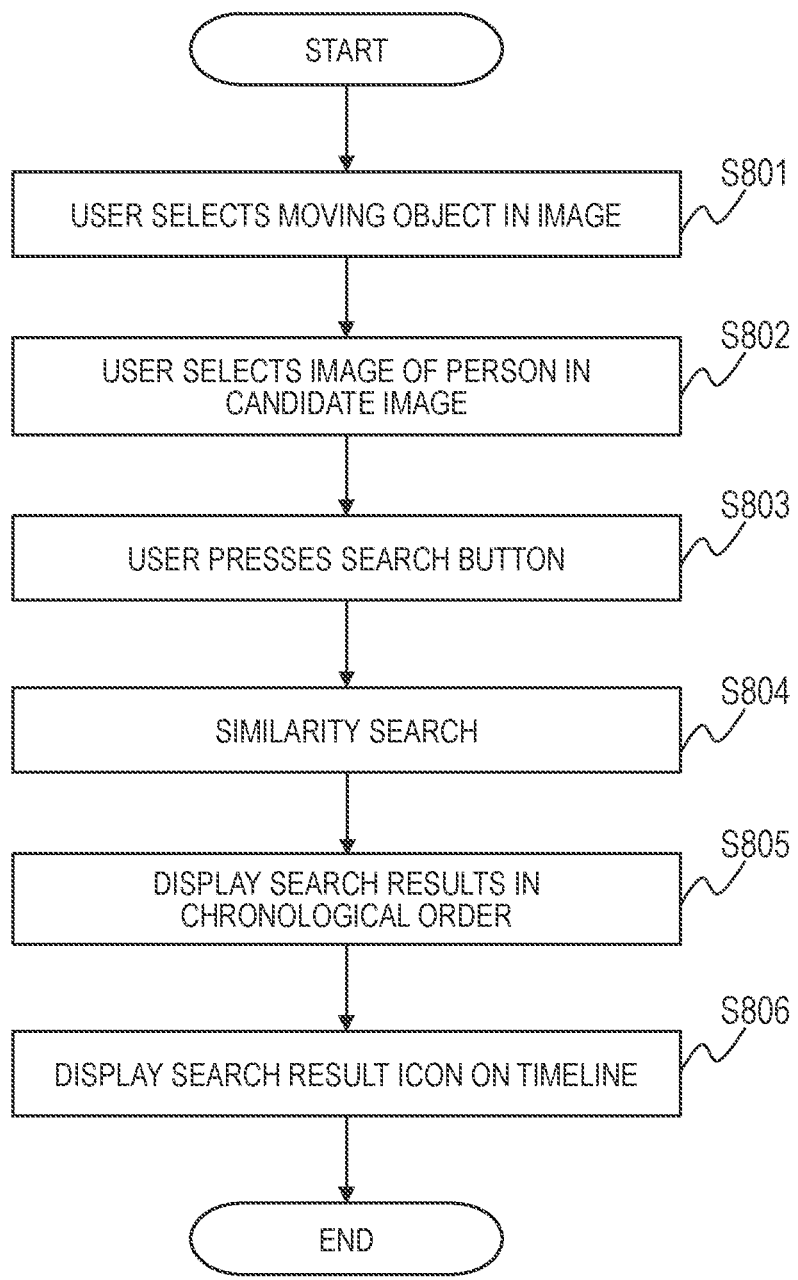
FIG. 8 is a flowchart of a moving object search process to be executed by the moving object tracking system according to an embodiment of the present invention.

FIG. 8 is a flowchart of a moving object search process to be executed by the moving object tracking system 100 according to an embodiment of the present invention.

First, the user selects a moving object in the image (step S801). For example, the user may select one or more moving objects (such as a person) included in the image displayed in the camera image area 504 of the search screen 501, operate the input device 103, and input information designating the image of the moving object. The explanation below describes an example in which an image of a person is selected as the image of a moving object, but a similar process is executed even if the image is of a moving object other than a person.

Next, the user selects an image of a person among the candidate images (step S802). For example, the user may select any of the images of a plurality of circumscribed rectangles of the same person displayed in the camera image area 505, operate the input device 103, and input information designating the person.

Next, the user operates the input device 103 and presses the search button 506D in the tag image area 506 (step S803).

Next, the feature value search unit 116 executes a similarity search on images stored in the video database 113 with the feature value of the image of the circumscribed rectangle of the person selected in step S802 as the search query (step S804).

Next, the feature value search unit 116 displays the search results of step S804 in the display device 104 in chronological order (step S805). As a result, a combination of images of the circumscribed rectangle of a person with degrees of similarity that exceed the threshold, and images of the entire frame including the circumscribed rectangle are displayed in the search result display area 508 in the order in which the images were captured, for example.

Next, the feature value search unit 116 displays in the display device 104 a search result icon on the timeline 508A (step S806). In the example of FIG. 5, a magnifying glass symbol is displayed as the search result icon at a position on the timeline 508A, in the search result display area 508, corresponding to the time at which the image of each search result 10 was captured.

The moving object search process is then complete.

Figure 9:
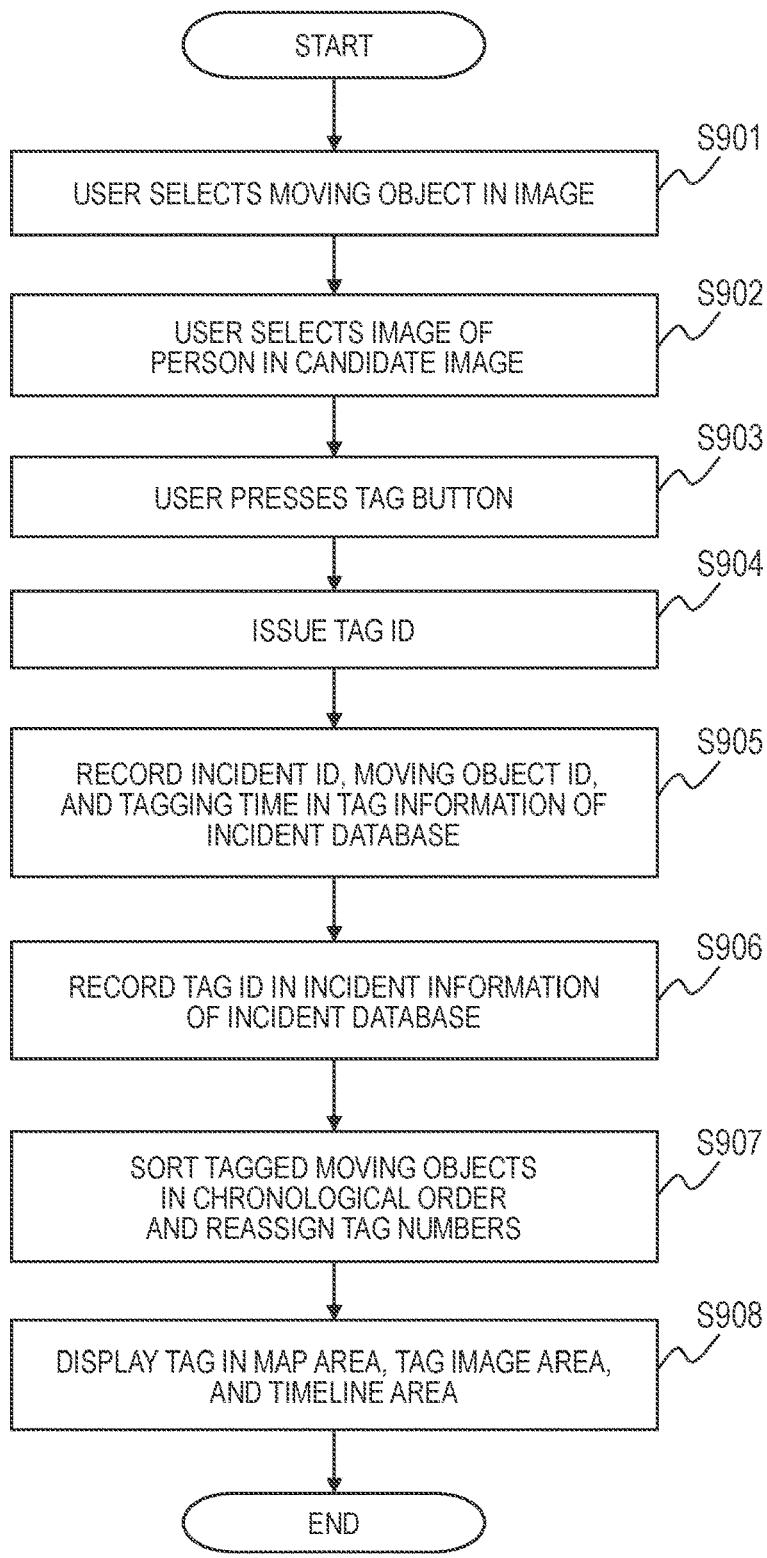
FIG. 9 is a flowchart of a tagging process to be executed by the moving object tracking system according to an embodiment of the present invention.

FIG. 9 is a flowchart of a tagging process to be executed by the moving object tracking system 100 according to an embodiment of the present invention.

First, the user selects a moving object in the image (step S901), and then selects an image of a person among the candidate images (step S902). These steps may be executed in a similar manner to steps S801 and S802, for example.

In order to tag a moving object displayed in the selected image area 506A of the tag image area 506, the user presses the tagging button 506C in the tag image area 506 by operating the input device 103 (step S903).

Next, the incident management unit 115 issues a tag ID (step S904).

Next, the incident management unit 115 adds a new record to the tag 25 management information 410 of the incident database 112, and records the tag ID issued in step S904 in the tag ID field 411 of the record, records the incident ID issued in step S705 of FIG. 7 in the incident ID field 412, records the moving object ID of the image of a person selected in step S902 in the moving object ID field 413, and records the time at which the tag ID was issued in step S904 in the tagging time field 414 (step S905).

Next, among the records of the incident management information 400 of the incident database 112, the incident management unit 115 adds the tag ID issued in step S904 to the tag ID field 406 of the record in which the incident ID issued in step S705 of FIG. 7 was recorded in the incident ID field 401.

Next, the incident management unit 115 sorts the tagged moving objects associated with the incident ID in the chronological order in which they were imaged and reassigns a number indicating the tag order (step S907). The tag order indicates the chronological order in which the images of the tagged moving objects were captured. The time at which the image of the tagged moving object was captured can be determined by identifying the moving object ID corresponding to the tag ID for identifying each tag with reference to the tag management information 410, identifying the frame ID corresponding to each moving object ID with reference to the moving object management information 310, and by identifying the imaging time corresponding to each frame ID with reference to the image data management information 300.

Next, the incident management unit 115 displays a tag in the map area 503, the tag image area 506, and the search result display area 508 of the display device 104. If a tag is already being displayed, then the tag is updated. In the example of FIG. 5, numbers indicating the order of imaging times of the respective moving objects are displayed at the positions of the video capturing devices 102 that captured the tagged moving objects in the map area 503.

Also numbers indicating the order of times at which the moving objects were imaged are displayed on the respective tagged moving objects within the tag image area 506. Additionally, numbers indicating the order of imaging times of the respective moving objects ("1", "2", "3" in the example of FIG. 5) are also displayed in the search result display area 508 at the positions on the timeline 508A corresponding to the times at which the tagged moving objects were imaged.

The tagging process is then complete.

Figure 10:
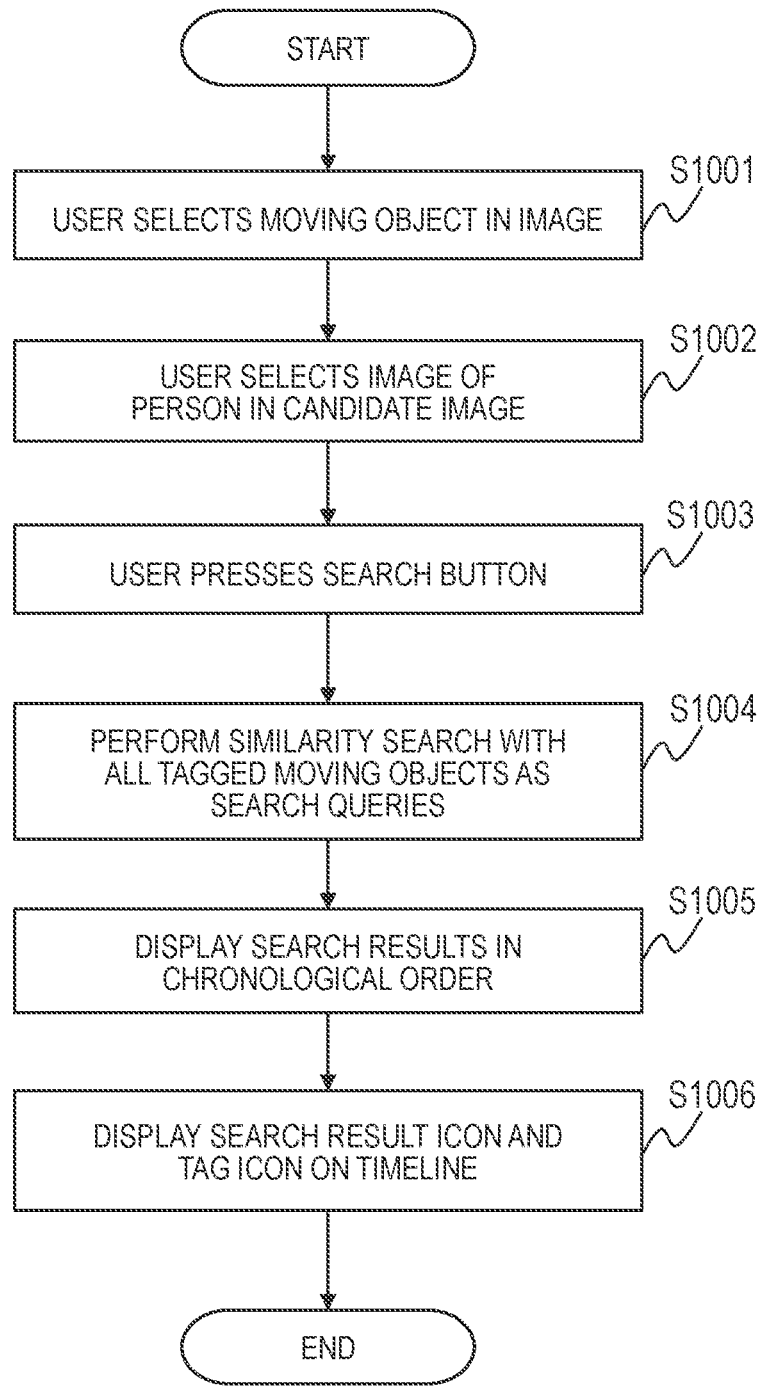
FIG. 10 is a flowchart of a tagging time moving object search process to be executed by the moving object tracking system according to an embodiment of the present invention.

FIG. 10 is a flowchart of a tagging time moving object search process to be executed by the moving object tracking system 100 according to an embodiment of the present invention.

First, the user selects a moving object in the image (step S1001), selects an image of a person among the candidate images (step S1002), and then presses the search button 506D (step S1003). These steps may be executed in a similar manner to steps S801 to S803, for example.

Next, the feature value search unit 116 executes a similarity search on images stored in the video database 113 with the feature values of the images of all tagged moving objects as the search queries (step S1004). A similar search to that of step 804 in FIG. 8 is executed for each search query, for example.

Next, the feature value search unit 116 displays the search results of step S1004 in the display device 104 in chronological order (step S1005). This step may be executed in a similar manner to step 805 of FIG. 8, for example.

Next, the feature value search unit 116 displays in the display device 104 search result icons and tag icons on the timeline 508A (step S1006). In the example of FIG. 5, a magnifying glass symbol is displayed as the search result icon at a position on the timeline 508A corresponding to the time at which the image of each search result was captured. Additionally, numbers indicating the order of imaging times ("1", "2", "3" in the example of FIG. 5) are displayed at the positions corresponding to the times at which the tagged images (images used as the search queries) were captured.

The tagging time moving object search process is then complete.

Here, a specific example of an operation using the moving object tracking system 100 will be described with reference to FIGS. 5 and 7 to 10. The process of FIG. 6 for the captured video is assumed here to have been completed. The examples, numbers, and the like in the description below constitute one example, and do not limit the present invention.

Here, as an example, a case will be described in which the incident is the abandoning of an article. If the discovery of an unclaimed article is reported, for example, then the user refers to past video captured of the location where the discovery was made and identifies a frame where a person who left the article is present.

The user then inputs the camera ID identifying the video capturing device 102 that captured the identified frame and the imaging time of the frame to the moving object tracking system 100 as the trigger camera ID and the trigger time, respectively (steps S701, S702), and presses the load button 502C (step S703). Then, images of frames captured during a prescribed period including the trigger time (for example, a 10 minute period from 5 minutes prior to 5 minutes after the trigger time) by the video capturing device 102 identified by the trigger camera ID are loaded (step S704).

At this time, the camera image area 504 may display an image of a frame captured at the trigger time among the loaded images, or may display an image at a given time around the time that the user selected, for example. When the user selects an image of a person who left behind the article among the displayed images, for example (step S801), images assigned the same tracking ID as the selected image are extracted from other loaded frames, and these are displayed in the candidate image area 505.

If the user selects any of the plurality of images displayed in the candidate image area 505 (step S802), then the image is displayed in the selected image area 506A of the tag image area 506. If the user presses the search button 506D (step S803), then a similarity search is executed (step S804), and the result thereof is displayed in the search result display area 508 (steps S805, S806).

The user may operate the threshold bar 508C while referring to the search results displayed in the search result display area 508 such that appropriate search results are attained. If appropriate search results are attained, then the user may press the tagging button 506C and tag images displayed at the time in the selected image area 506A (see FIG. 9). These images are displayed in the tag display area 506B along with the tag numbers.

Here, the user can additionally select other images displayed in the candidate image area 505 (step S1002). In such a case, the feature value search unit 116 executes a similarity search with tagged images and newly selected images as the search queries (step S1004). The display device 104 updates the content displayed in the search screen 501 such that results of the executed similarity search are displayed.

Alternatively, if it is determined that an image that could be used as a search query is included among the images within the search results displayed in the search result display area 508, for example, the user may select that image or an image captured therearound. Specifically, the moving object tracking system 100 may load images captured over a prescribed time period including the imaging time at which the video capturing device 102 captured the image (10 minute period from 5 minutes prior to 5 minutes after the imaging time, for example), and display images included therein in the camera image area 504. In this case, if the user selects an image of a person among the images, for example, then images assigned the same tracking ID as the image are extracted and displayed in the candidate image area 505. The process thereafter is similar to what was described above.

If the image initially selected is one in which the person is imaged from the front, for example, then it would be easy to use the image as a search query to acquire images similarly captured from the front, and it would be relatively more difficult to attain images in which the person is imaged from another direction. This similarly applies to cases in which the person changes attire or personal belongings, and if the person changes attire after having left behind the article or is in possession of another article, for example, then images thereafter are difficult to search. Thus, if the user discovers images, from among candidate images or images acquired by performing the search, in which the person is imaged from another direction, the person is wearing different attire or holding a different article, or the like, then by adding such images to the search query, a search without omissions can be executed.

If a plurality of images are selected as search queries, as described above, then the similarity search in step S1004 is executed as follows, for example.

The feature value search unit 116 may execute a search with the feature values of the images as the search queries, calculate a score indicating the degree of similarity between found images and images in the search queries, and output images with the highest scores as the search results.

Alternatively, the feature value search unit 116 may determine a representative value of the feature values of a plurality of search queries, and execute a search using the representative value. If many images are selected as search queries, for example, the feature value search unit 116 may cluster the feature values of the images and execute searches with the representative value of each cluster as the search query.

In the description above made with reference to FIG. 5 and the like, it was indicated that the user selects an image of a moving object included in the loaded video and that a similarity search is only executed when the user presses the search button 506D, but in reality, the search may be started automatically. Upon loading video, the moving object tracking system 100 may display the images at the trigger time in the camera image area 504, automatically select an image of the moving object included among the images as the search query, execute a similarity search, and display the results thereof in the search result display area 508, for example.

Generally, when tracking a person who left behind an article, for example, an image that sufficiently displays the features of the person would be selected as the trigger, and thus, by automatically selecting as the search query a moving object having the largest circumscribed rectangle among the loaded trigger time images, for example, the amount of work required of the user can be reduced. In such a case, the automatically selected moving object may be one not desired by the user, but then, the user can attain desired search results by reselecting an image of the moving object.

Also, the user may operate the threshold bar 508C after search results are displayed in the search result display area 508, to change the similarity threshold. The feature value search unit 116 executes a similarity search using the changed similarity search, and outputs the results to the display device 104. The display device 104 updates the content displayed according to the search results of the feature value search unit 116.

As described above, an information processing system (moving object tracking system 100, for example) according to one aspect of the present invention has a processor (processor 201, for example), a storage device coupled to the processor (storage device 202, for example), and a display device coupled to the processor (display device 104, for example). The storage device stores a plurality of images captured by a plurality of imaging devices (video capturing devices 102, for example). If an image of a moving object (an image of a person displayed in the candidate image area 505, for example) is selected as a search query, then the processor executes a similarity search on the plurality of images stored in the storage device, with the selected image as the search query (step S804, for example). Then, the processor outputs, to the display device, data for displaying a plurality of images attained as results of the similarity search, and the display device displays images according to the data (step S805, for example). Additionally, if an image of a moving object is added as a search query, then the processor executes a similarity search with all selected images as search queries (step S1004, for example). Then, the processor transmits, to the display device, data for updating images to be displayed such that a plurality of images attained as results of the similarity search performed with all selected images as the search queries are displayed, and the device displays updates the images to be displayed according to the data (step S1005, for example).

As a result, the coverage of the search for the moving object from the images is improved, and it is possible to track the moving object with ease, for example.

Here, the display device may display the plurality of images attained as similarity search results in chronological order of being captured (image display area 508B, for example).

As a result, it is easier to track a moving object on the basis of the searched images.

Also, the display device may display information indicating the imaging times of the images attained as similarity search results (image display area 508B, for example).

As a result, it is easier to track a moving object on the basis of the searched images.

Here, information indicating the imaging times of the images may be the difference between the current time and the imaging time of each image ("15 seconds prior" in image display area 508B, for example).

As a result, it is easier to narrow down the range of possibilities of where the moving object, which is being tracked on the basis of the searched images, is present.

Also, the display device outputs an image of a map (map area 503, for example) that includes the display of the position of the imaging device that captured the image selected as the search query, and if an additional image of a moving object is selected as a search query, then the image of the map may be updated so as to add to the display the position of the imaging device that captured the additionally selected image (step S908, for example).

As a result, it is easier to ascertain the location where the moving object being tracked is present.

Also, the processor may perform a process in which a moving object is detected in an image, captured by each imaging device, stored in the storage device (step S604, for example); it is determined whether the moving object is the same as a moving object detected in images captured by the same imaging device at different times (step S606, for example); if the display device receives input of the identification information of the imaging device and the time (steps S701-S703, for example), the display device displays a plurality of images (images in candidate image area 505 displayed in step S806, for example) of the same moving object as the moving object of the selected image that was detected in a plurality of images, among the images stored in the storage device, captured by the imaging device identified according to the inputted identification information during a time period including the inputted time; and if one or more of the plurality of images displayed in the display device are additionally selected as the search query, then the processor executes a similarity search with all selected images as search queries (step S1004, for example).

As a result, it becomes easier for the user to add appropriate search queries, and the coverage of the search is improved.

Also, if an image of a moving object included among the plurality of images attained as results of the similarity search (images displayed in the image display area 508B, for example) is additionally selected as a search query, then the processor may execute a similarity search with all selected images as search queries (step S1004, for example).

As a result, it becomes easier for the user to add appropriate search queries, and the coverage of the search is improved.

At this time, the processor may perform a process in which a moving object is detected in an image, captured by each imaging device, stored in the storage device (step S604, for example); it is determined whether the moving object is the same as a moving object detected in images captured by the same imaging device at different times (step S606, for example); when any of the plurality of images attained as results of the similarity search (images displayed in image display area 508B, for example) is selected, the display device displays a plurality of images of the same moving object as the moving object in the selected image that was detected in the plurality of images captured during a time period including the time at which the imaging device captured the selected image (candidate image area 505 for when image displayed in the image display area 508B is selected, for example); and if one or more of the plurality of images displayed in the display device are additionally selected as the search query, then the processor executes a similarity search with all selected images as search queries (step S1004, for example).

As a result, it becomes easier for the user to add appropriate search queries, and the coverage of the search is improved.

Also, the display device may display all images selected as search queries in chronological order of being captured (steps S907, S908, tag display area 506B, for example).

As a result, it becomes easier for the user to see the images selected as search queries, and if the external appearance of the moving object changes (such as if the person changes attire or holds different personal belongings, for example), then the degree of change can be more easily understood.

Also, the processor may calculate, for each selected image, a score indicating the degree of similarity of the feature value thereof to the feature value of an image of a moving object detected in images stored in the storage device, and output the images with the highest scores as the search results (step S1004, for example).

As a result, if a plurality of images are selected as search queries, then it is possible to output appropriate search results and improve search coverage.

Also, the processor may cluster the feature values of the plurality of selected images into a plurality of clusters, calculate a score indicating the degree of similarity of the representative value of each cluster to the feature value of an image of a moving object detected in images stored in the storage device, and output the images with the highest scores as the search results (step S1004, for example).

As a result, even if multiple images are selected as search queries, it is possible to improve search coverage while mitigating an increase in the amount of computation performed.

The present invention is not limited to the embodiments above, and includes various modification examples. The embodiments above were described in detail in order to explain the present invention in an easy to understand manner, but the present invention is not necessarily limited to including all configurations described, for example.

Some or all of the respective configurations, functions, processing units, processing means, and the like can be realized with hardware such as by designing an integrated circuit, for example. Additionally, the respective configurations, functions, and the like can be realized by software, by the processor interpreting programs that realize the respective functions and executing such programs. Programs, data, tables, files, and the like realizing respective functions can be stored in a storage device such as a non-volatile semiconductor memory, a hard disk drive, or a solid state drive (SSD), or in a computer-readable non-transitory data storage medium such as an IC card, an SD card, or a DVD.

Control lines and data lines regarded as necessary for explanation have been indicated, but not all control lines and data lines in the product have necessarily been indicated. In reality, almost all components can be thought of as connected to each other.

What is claimed is:

1. An information processing system, comprising:
a processor;
a storage device coupled to the processor; and
a display device coupled to the processor,
wherein the storage device stores a plurality of images captured by a plurality of imaging devices,
wherein if an image of a moving object is selected as a search query, then the processor executes a similarity search on the plurality of images stored in the storage device, with the selected image as the search query,
wherein the display device displays a plurality of images attained as results of the similarity search,
wherein if an image of a moving object is added as a search query, then the processor executes a similarity search with all selected images as search queries, and
wherein the display device updates images to be displayed such that a plurality of images attained as results of the similarity search performed with all the selected images as the search queries are displayed,
wherein the processor detects moving objects from the images captured by the imaging devices and stored in the storage device,
wherein the processor determines whether the moving objects detected in images captured by a same imaging device at differing times are a same moving object,
wherein, if identification information of the imaging device and a time are inputted, the display device displays a plurality of images, among the images stored in the storage device, of the same moving object as the moving object of the selected image that was detected in the plurality of images captured by the imaging device identified by the inputted identification information during a time period including the inputted time,
wherein if one or more of the plurality of images displayed by the display device are added as search queries, then the processor executes a similarity search with all the selected images as the search queries, and
wherein the display device:
displays an image of a map that displays a position of the imaging device that captured the image selected as the search query, and
if an additional image of the moving object is selected as a search query, then updates the image of the map so as to add to the display the position of the imaging device that captured the additionally selected image.

2. The information processing system according to claim 1,
wherein the display device displays the plurality of images attained as the results of the similarity search in chronological order of being captured.

3. The information processing system according to claim 2,
wherein the display device displays information indicating a time at which each image attained as the results of the similarity search was captured.

4. The information processing system according to claim 3,
wherein the information indicating the time at which each said image was captured is a difference between a current time and the time at which each said image was captured.

5. The information processing system according to claim 1
wherein when any one of the plurality of images attained as results of the similarity search is selected, the display device displays the plurality of images of the same moving object as the moving object in the selected image that was detected in the plurality of images captured during a time period including a time at which the image selected by the imaging device was captured, and
wherein if one or more of the plurality of images displayed by the display device are added as search queries, then the processor executes a similarity search with all the selected images as the search queries.

6. The information processing system according to claim 1,
wherein the display device displays all of the images selected as the search queries in chronological order of being captured.

7. The information processing system according to claim 1,
wherein the processor calculates, for each of the selected images, a score indicating a degree of similarity of a feature value thereof to feature values of images of a moving object detected in the images stored in the storage device, and outputs images with the highest scores as search results.

8. The information processing system according to claim 1,
wherein the processor performs clustering on feature values of the plurality of selected images so as to classify the feature values into a plurality of clusters, calculates a score indicating a degree of similarity of a representative value of each cluster to feature values of images of a moving object detected in images stored in the storage device, and outputs the images with the highest scores as the search results.

9. A method for controlling an information processing system having a processor, a storage device coupled to the processor, and a display device coupled to the processor,
wherein the storage device stores a plurality of images captured by a plurality of imaging devices, and
wherein the method comprises the steps of:
executing, by the processor, if an image of a moving object is selected as a search query, a similarity search on the plurality of images stored in the storage device, with the selected image as the search query;
displaying, by the display device, a plurality of images attained as results of the similarity search;
executing, by the processor, if an image of a moving object is added as a search query, a similarity search with all selected images as search queries;
updating, by the display device, images to be displayed such that a plurality of images attained as results of the similarity search performed with all the selected images as the search queries are displayed;

detecting, by the processor, moving objects from the images captured by the imaging devices and stored in the storage device, determining, by the processor, whether the moving objects detected in images captured by a same imaging device at differing times are a same moving object, if identification information of the imaging device and a time are inputted, displaying, by the display device, a plurality of images, among the images stored in the storage device, of the same moving object as the moving object of the selected image that was detected in the plurality of images captured by the imaging device identified by the inputted identification information during a time period including the inputted time;

if one or more of the plurality of images displayed by the display device are added as search queries, executing, by the processor, a similarity search with all the selected images as the search queries;

displaying, by the display device, an image of a map that displays a position of the imaging device that captured the image selected as the search query; and if an additional image of the moving object is selected as a search query, updating, by the display device, the image of the map so as to add to the display the position of the imaging device that captured the additionally selected image.

10. A non-transitory computer-readable storage medium that stores programs that control the computer, wherein the computer has a processor, a storage device coupled to the processor, and a display device coupled to the processor, wherein the storage device stores a plurality of images captured by a plurality of imaging devices, and wherein the program causes the processor to:

execute, if an image of a moving object is selected as a search query, a similarity search on the plurality of images stored in the storage device, with the selected image as the search query;

output, to the display device, data for displaying a plurality of images attained as results of the similarity search;

execute, if an image of a moving object is added as a search query, a similarity search with all selected images as search queries;

output, to the display device, data for updating images to be displayed such that a plurality of images attained as results of the similarity search performed with all the selected images as the search queries are displayed;

detecting, by the processor, moving objects from the images captured by the imaging devices and stored in the storage device, determine whether the moving objects detected in images captured by a same imaging device at differing times are a same moving object;

if identification information of the imaging device and a time are inputted, output, to the display device, a plurality of images, among the images stored in the storage device, of the same moving object as the moving object of the selected image that was detected in the plurality of images captured by the imaging device identified by the inputted identification information during a time period including the inputted time;

if one or more of the plurality of images displayed by the display device are added as search queries, execute a similarity search with all the selected images as the search queries;

display, by the display device, an image of a map that displays a position of the imaging device that captured the image selected as the search query; and if an additional image of the moving object is selected as a search query, update, by the display device, the image of the map so as to add to the display the position of the imaging device that captured the additionally selected image.

* * * * *